June 10, 1930. W. J. HOBBINS 1,763,153
COMBINED WINDSHIELD WIPER AND ICE REMOVER
Filed Feb. 27, 1928
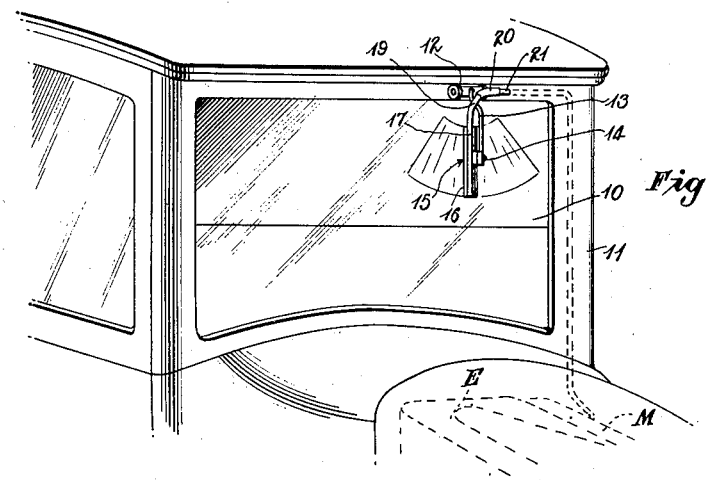
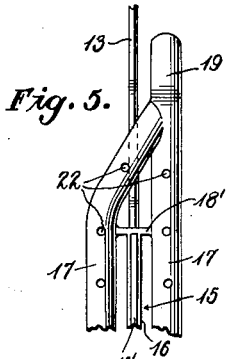
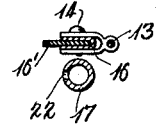
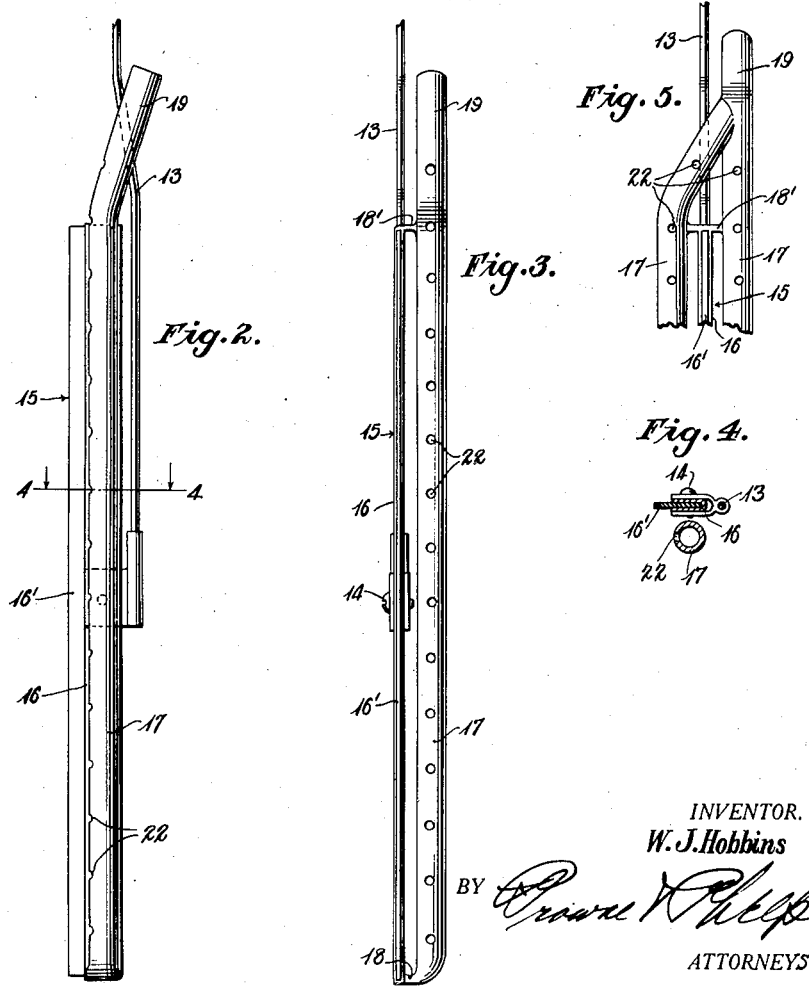
INVENTOR.
W. J. Hobbins
BY
ATTORNEYS Patented June 10, 1930

1,763,153

UNITED STATES PATENT OFFICE

WILLIAM J. HOBBINS, OF MADISON, WISCONSIN

COMBINED WINDSHIELD WIPER AND ICE REMOVER

Application filed February 27, 1928. Serial No. 257,352.

This invention relates to a combined wiper and ice remover, primarily for the windshields of automobiles.

A prime object is to provide a device having a mutually dependent and coacting wiper and means to discharge a portion of the engine exhaust onto the windshield whereby ice or snow will be melted and removed practically at the instant of melting and through the same sweep or motion of the wiper.

Another object is to provide a device of the character mentioned in which the wiper frame has an exhaust discharge pipe carried thereby and arranged in bracing relation therewith.

Additional objects and advantages will be specifically pointed out or become apparent from a consideration of the description following taken in connection with the accompanying drawings illustrating an operative embodiment.

In said drawings:

Fig. 1 is a view in perspective showing an automobile fragmentarily and equipped with my invention;

Fig. 2 is a side elevation of the device, taken from the left relative to Fig. 1;

Fig. 3 is a rear view or elevation of that side of the device which faces the windshield;

Fig. 4 is a detail cross-sectional view taken on the line 4—4 of Fig. 2, and

Fig. 5 is a fragmentary view corresponding to Fig. 4 of a modified form.

Referring specifically to the drawings wherein like reference characters designate like or similar parts, an automobile of the closed type is fragmentarily shown having a windshield 10 and a frame 11, in connection with which the present invention is shown by way of example.

Fastened to such frame 11, is a conventional motor 12 operable for instance to oscillate an arm 13, which is pivoted at 14 to a windshield wiper 15. It is immaterial whether said motor 12 be electric or operable by suction of the propelling engine of the automobile, or otherwise. The wiper 15 may consists of an elongated metallic holder or frame 16, V-shaped in cross section and retaining a rubber squeegee or the equivalent 16' which is arranged in direct wiping contact with the outer surface of windshield 10.

Arranged relatively close to hold 16 and in parallelism therewith is a copper or other metallic tube or pipe 17, the lower end of which is shown as contracted to close the same and form an attaching portion 18 which may be soldered, brazed or otherwise secured to frame 16 at one end of the latter. The other end of frame 16 is soldered, brazed or otherwise secured to tube 17 as at 18', and the tube 17 is extended above or beyond such joint 18' and slightly deflected outwardly as at 19 where a flexible hose 20 is slipped thereover to frictionally and detachably engage same. Hose 20 is also fastened to a metallic pipe 21 secured to the frame 11 in any approved manner and which leads from the exhaust manifold M of the propelling engine E of the automobile which is equipped with my improvements. A portion of the exhaust from such engine will pass through pipe 21, hose 20 and tube 17, and escape from the latter through ports or orifices 22 which are arranged in a single row and relatively close together so as to discharge the exhaust in fine streams at a right angle against the windshield 10, relatively close to the wiper 15.

As a result of the construction described, as the wiper 15 oscillates, hot exhaust gases discharge through the orifices 22 and practically against the same portion of the windshield as is engaged by the squeegee. Accordingly, the hot exhaust, aided by its pressure, will melt or loosen ice or snow forming on the windshield and the wiper will remove the same. Such melting or loosening of the ice or snow occurs at the instant of its melting and on the same stroke or swing of the device, to which end the tube 17 and wiper coact, in that the former causes the melting or loosening of the ice or snow, and the latter removes same immediately and before it can again freeze.

Various changes may be resorted to within the spirit and scope of the invention as defined by appended claims. For example and as shown in Fig. 5, two of the tubes 17, instead of one may be used, and are disposed one on each side of the wiper 15, such tubes for instance branching from a Y to which hose 20 is applied similarly to portion 19 of the first form.

I claim as my invention:

1. In combination, an oscillating windshield wiper, a tube carried thereby and parallel therewith means for connecting said tube with the exhaust line of an engine, said tube being perforated to discharge the exhaust against the windshield.

2. In combination, an oscillating windshield wiper, a tube carried thereby in relatively close and parallel relation thereto, said tube having an attaching end extending beyond the wiper for connection with the exhaust line of an engine, said tube being perforated to discharge the exhaust against the windshield close to the wiper.

3. In combination, an oscillating windshield wiper, a tube carried thereby in relatively close and parallel relation thereto, said tube at one end being closed and forming an attaching portion secured to one end of the wiper, the other end of the wiper being secured to the tube, the tube extending beyond the latter end and being deflected and adapted for connection with the exhaust line of an engine, said tube having a row of orifices to discharge the exhaust against the windshield close to the wiper.

WILLIAM J. HOBBINS.